J. BREWER.
FUEL AND HEATING SYSTEM.
APPLICATION FILED APR. 22, 1915.
1,169,119.
Patented Jan. 25, 1916.
5 SHEETS—SHEET 1.
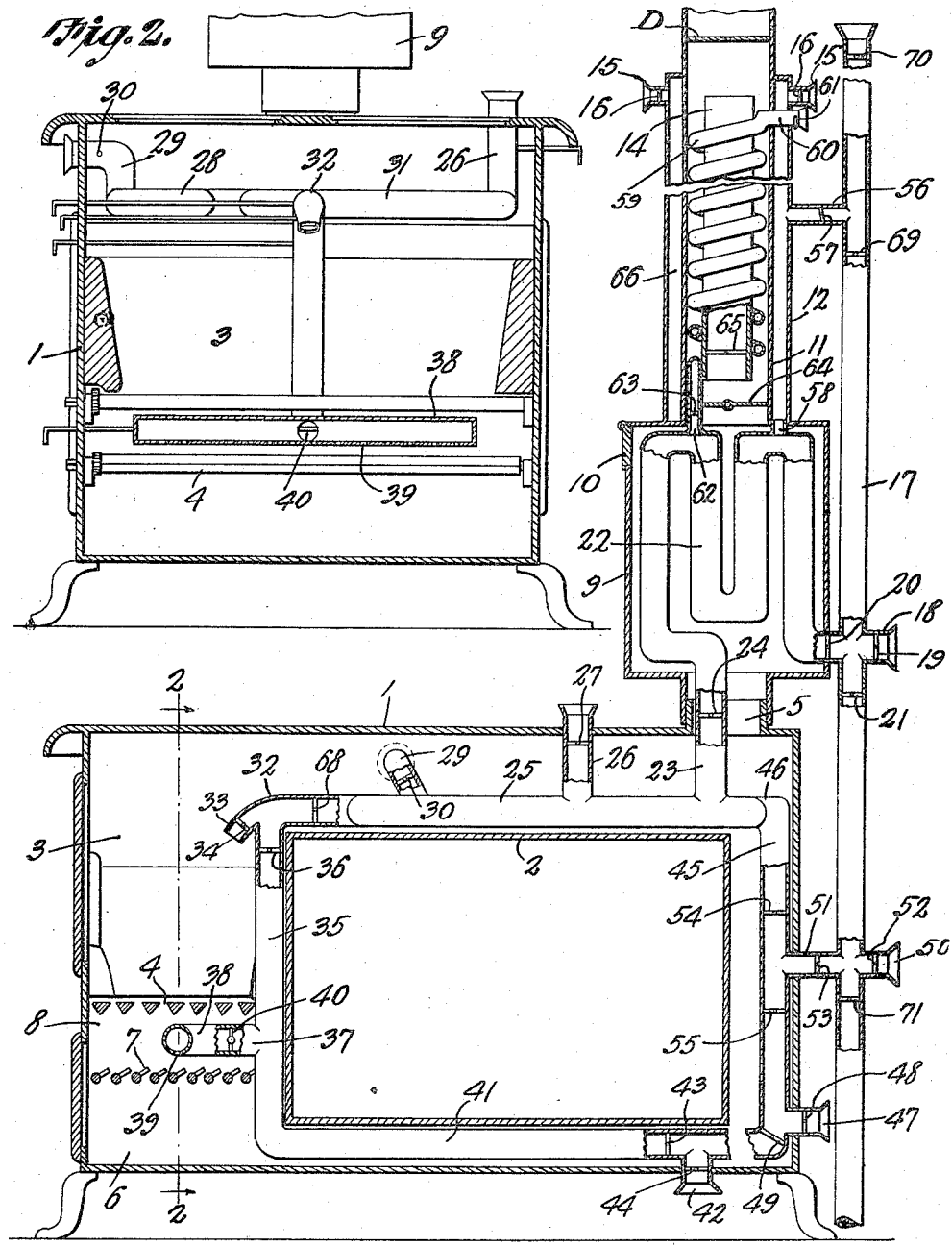
Witnesses
Jacob Brewer  Inventor
by
Attorneys

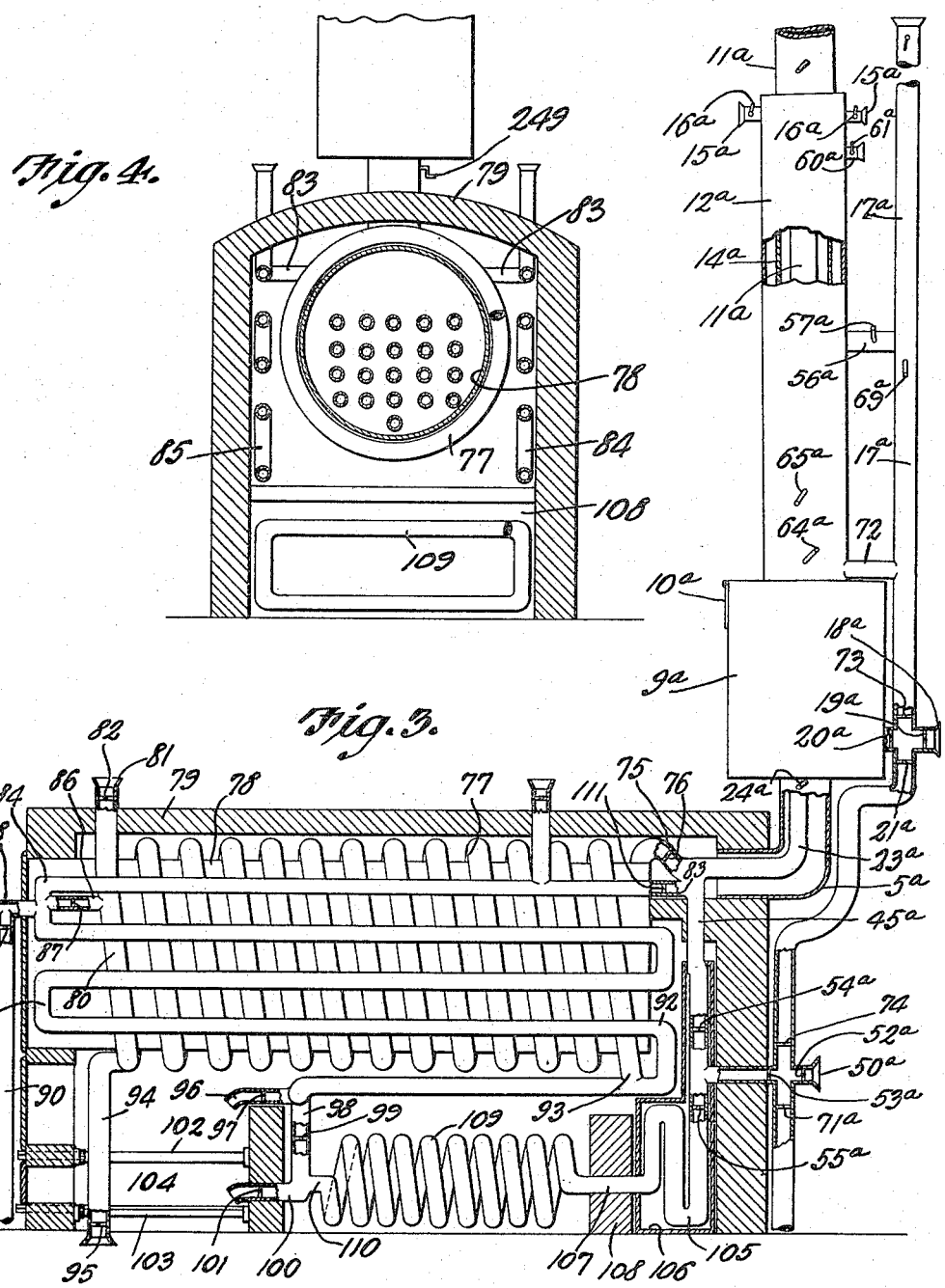

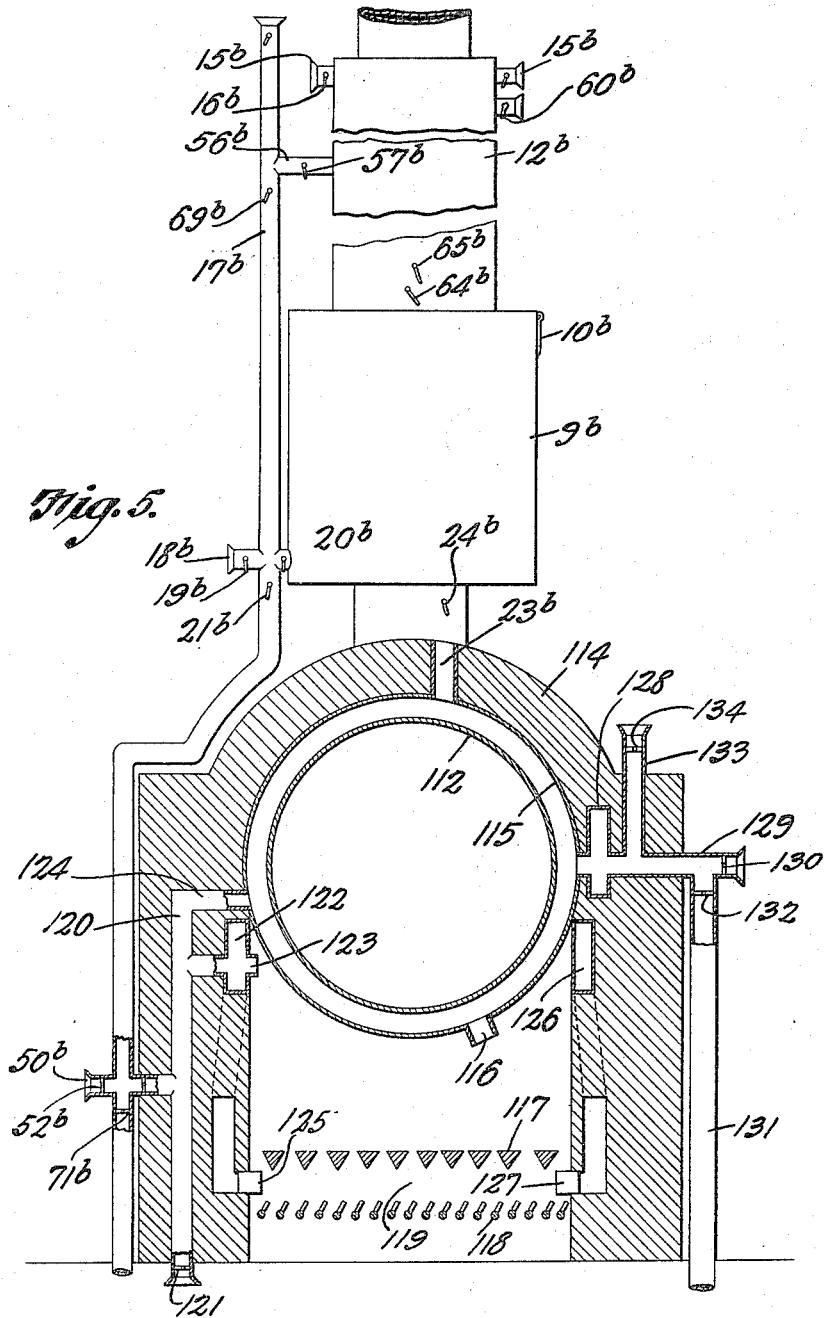

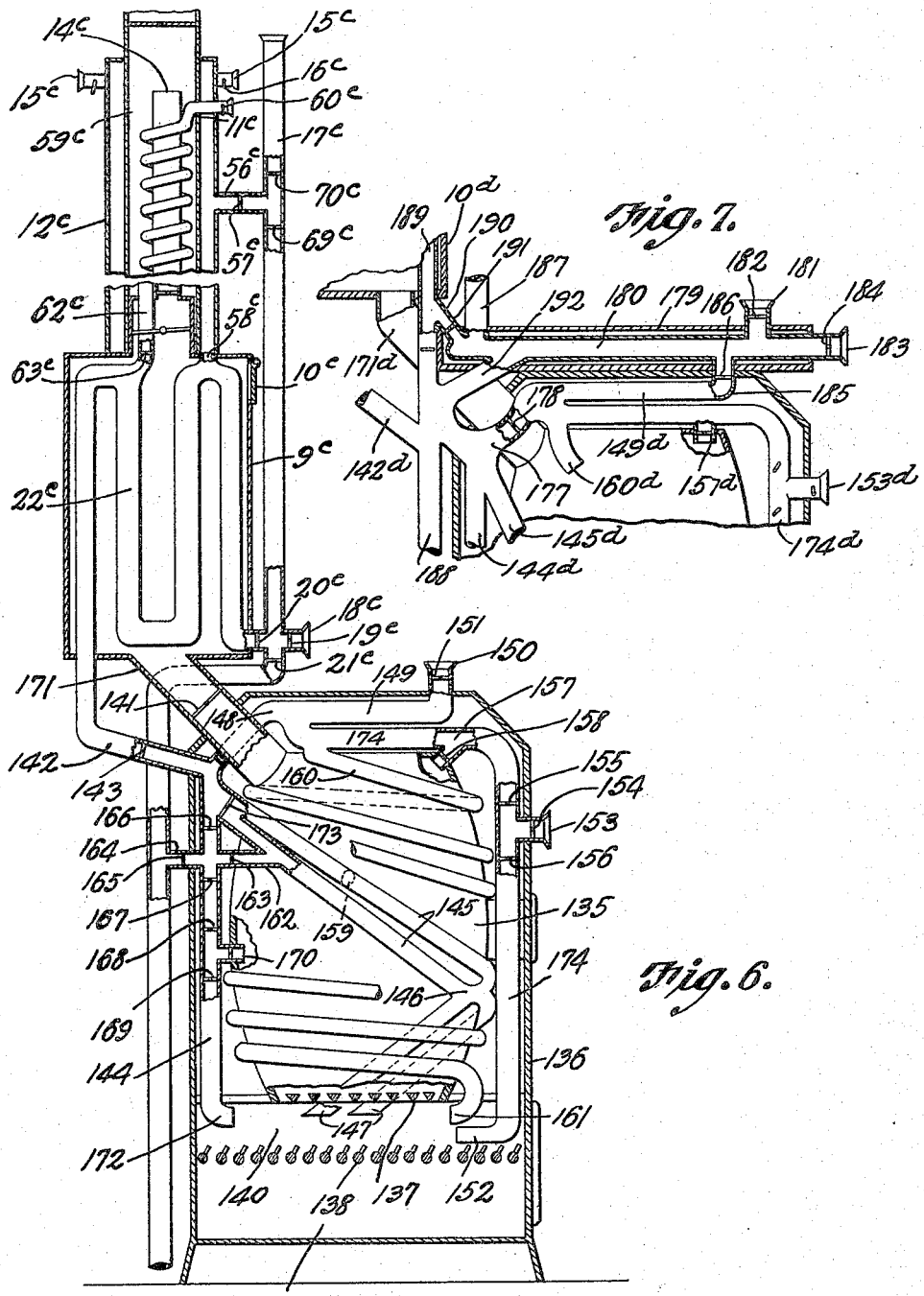

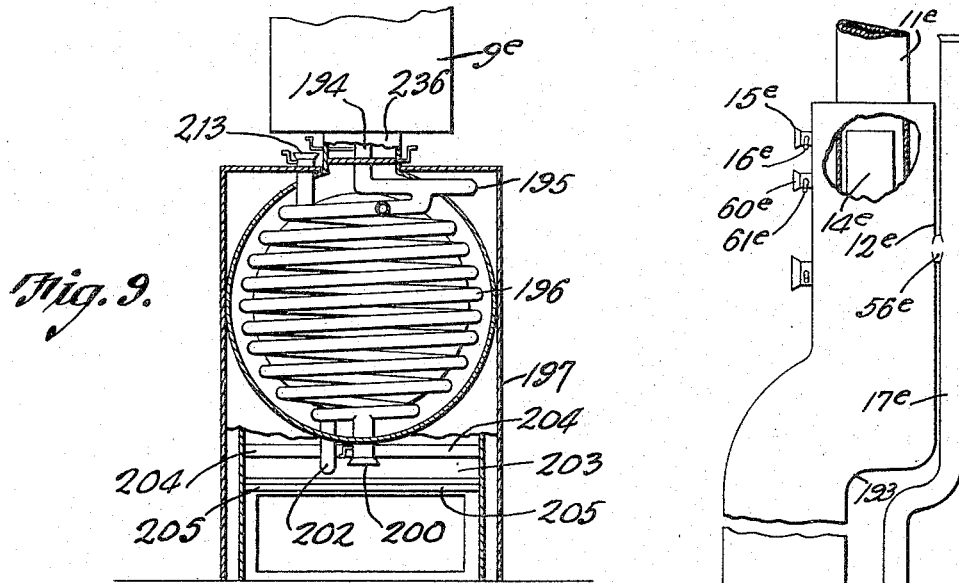
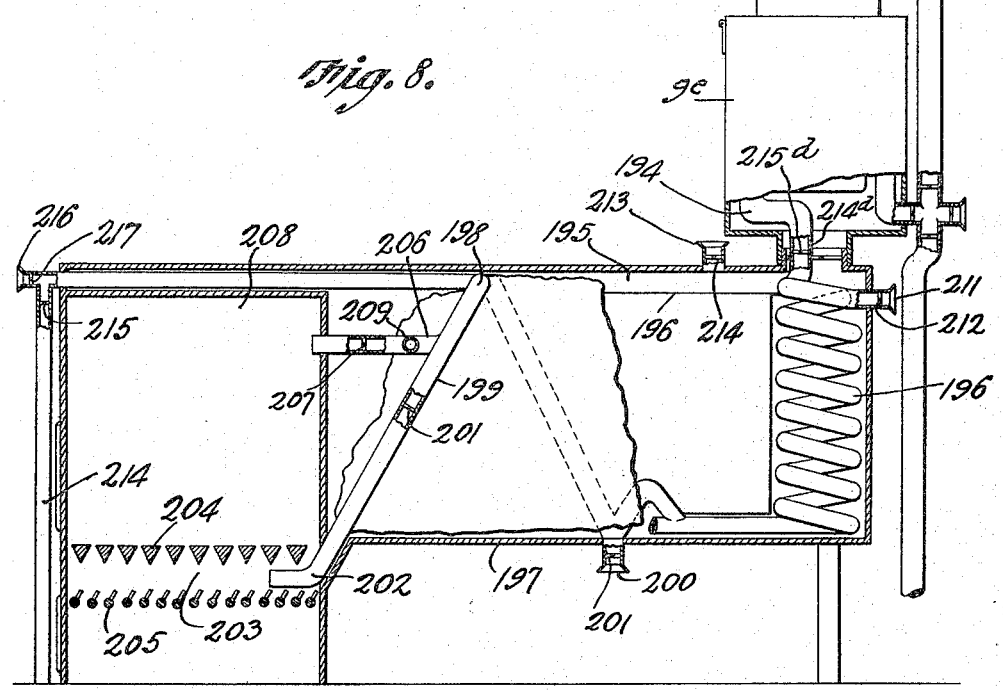

UNITED STATES PATENT OFFICE.

JACOB BREWER, OF HAZLETON, PENNSYLVANIA.

FUEL AND HEATING SYSTEM.

1,169,119.  Specification of Letters Patent.  Patented Jan. 25, 1916.

Application filed April 22, 1915. Serial No. 23,265.

*To all whom it may concern:*

Be it known that I, JACOB BREWER, a citizen of the United States, residing at Hazleton, in the county of Luzerne and State of Pennsylvania, have invented a new and useful Fuel and Heating System, of which the following is a specification.

The device forming the subject matter of this application is adapted to be employed in connection with a heater of any sort, to the end that the products of combustion may be employed for heating air, which air, at the will of the operator, having been heated, is returned either to the combustion space of the heater, below the grate of the heater, or in both of the places above indicated, as may be desired.

The invention aims to provide a device of the sort above indicated in which a direct draft or an indirect draft may be created readily, novel means being provided for introducing fresh air at intervals.

The invention is adapted to effect a thorough and complete combustion of the gaseous products emanating from the grate.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—Figure 1 shows in vertical longitudinal section, one form of the invention; Fig. 2 is a cross section of the structure shown in Fig. 1; Fig. 3 is a fragmental longitudinal section showing a modified form of the invention, parts appearing in elevation; Fig. 4 is a cross section of the structure shown in Fig. 3; Fig. 5 is a cross section showing a modified form of the invention, divers parts appearing in elevation; Fig. 6 is a fragmental longitudinal section showing a modified form of the invention; Fig. 7 is a sectional detail illustrating a modified detail of the structure appearing in Fig. 6; Fig. 8 is a fragmental longitudinal section showing a still further modification of the invention parts appearing in elevation; Fig. 9 is a cross section of the structure shown in Fig. 8.

In carrying out the invention as disclosed in Figs. 1 and 2 there is provided a cook stove or range embodying a casing 1, an oven 2, a combustion space 3, a grate 4 and an outlet 5 for the products of combustion. The ash pit appears at 5. Disposed in the ash pit 6 below the grate 4 are a plurality of movable dampers 7 adapted to be operated and to coöperate to form a closure extended across the ash pit 6 below the grate 4, thereby to define below the grate 4 a compartment 8.

Assembled with the outlet 5 is a drum 9 having a hingedly mounted valve 10 which is closed under its own weight. Should an explosion of unconsumed gases occur within the drum 9, the valve 10 will open to relieve the undue pressure thus created and will immediately close. Assembled with the top of the drum 9 and opening thereinto is a main stack 11 carrying a main damper D and surrounded by a jacket 12, closed at its upper end about the stack 11. The jacket 12 does not open into the drum 9. Located within the contour of the main stack 11 is a supplemental stack 14. The jacket 12 has inlets 15 controlled by dampers 16.

Extended vertically and prolonged either upwardly or downwardly to any desired extent is an air pipe 17 provided intermediate its ends with an inlet 18 having dampers 19 and 20 located upon opposite sides of the pipe 17. Disposed in the pipe 17 below the inlet 18 is a damper 21. The inlet 18 is alined with one end of a sinuous flue 22 located within the drum 9 and constitutes to all intents and purposes, a part of the flue 22. One end of the flue 22, designated by the reference character 23, passes downwardly through the outlet 5 and is provided with a damper 24.

The portion 23 of the flue 22 communicates with a horizontal flue 25 located above the oven 2 and provided with a vertical air inlet 26 extended through the top of the casing 1 and provided with a damper 27. The flue 25 embodies a lateral branch 28 terminated in an air inlet 29 passing laterally through the side wall of the stove and provided with a damper 30. The flue 25 is extended transversely of the oven 2 near to the front thereof, as shown at 31 and is continued forwardly as shown at 32, the portion 32 of the flue having a depending outlet 33 in which is located a damper 34. A vertical branch 35 communicates with the part 32 of the flue and is equipped with a damper 36. Branched off from the part 35 of the flue and located between the grate 4 and the coöperating dampers 7 is a tubular arm 37 provided with a transverse head 38 located in the compartment 8 and provided with perforations 39. Disposed in the arm 37 is a damper 40. The part 35 of the flue is prolonged as shown at 41 beneath the oven 2 and is equipped with a tubular inlet 42 passing downwardly through the bottom of the casing 1, the inlet 42 being provided with a damper 44 and there being a damper 43 in the part 41 of the flue near to the inlet 42. The lower, horizontal portion 41 of the flue is upwardly extended as shown at 45 and connects with the horizontal member 25 of the flue at 46. Near to the bottom of the casing 1, the portion 45 of the flue is equipped with an air inlet 47 controlled by a damper 48. A damper 49 is located at the point where the flue elements 45 and 41 are connected.

The air pipe 17 is equipped with an inlet 50 located opposite to a connecting pipe 51 which unites the pipe 17 with the part 41 of the flue. In the connecting pipe 51 is disposed a damper 53, and a damper 52 is located in the inlet 50. Dampers 54 and 55 are placed in the part 45 of the flue, above and below the connecting pipe 51. A connecting pipe 56 unites the jacket 12 with the pipe 17 and in the connecting pipe 56 is placed a damper 57. A space 66 exists between the main stack 11 and the jacket 12 and communicates with one bend of the sinuous flue 22 through the medium of a nipple 58.

Surrounding the stack 14 and located in the space 67 between the stack 14 and the stack 11 is a coil 59 having an inlet 60 extended through the stack 11 and the jacket 12, the inlet 60 being provided with a damper 61. As shown at 62, the lower end of the coil 59 communicates with one bend of the sinuous flue 22, and the portion 52 of the coil is supplied with a damper 63.

In the main stack 11 near to the top of the drum 9 is a damper 64, a damper 65 being placed in the supplemental stack 14, close to the lower end thereof. In the part 25 of the flue on top of the oven 2 is located a damper 68. In the pipe 17 below the connecting pipe 56 is a damper 69. In the pipe 17 above the connecting pipe 56 is a damper 70 and in the pipe 17 below the connecting pipe 51 is a damper 71.

When the fuel burns on the grate 4, the products of combustion emanating from the combustion space 3 pass upwardly through the drum 9. The air in the flue 22 is heated and is drawn downwardly, the air being delivered into the combustion space 3 through the outlet 33, or into the compartment 8 through the perforated head 38. If the damper 65 in the supplemental stack 14 is closed, the products of combustion will rise in the space 67 between the stack 14 and the stack 11 and heat the air in the coil 59, air being admitted to the coil 59 through the inlet 60 controlled by the damper 61. The heated air in the coil 59 is drawn down into the flue 22 through the part 62 of the coil controlled by the damper 63. Air enters the space 66 between the jacket 12 and the flue 11 through either of the inlets 15 controlled by the dampers 16. From the space indicated at 66, the heated air passes into the flue 22 through the nipple 58. Cold air may be delivered to the flue 22 if the dampers 19 and 20 are open, the dampers 69, 61 and 63 being closed. Cold air enters the flue 22 through the lower end of the pipe 17, if the dampers 53 and 52 and 19 are closed, the dampers 20, 21 and 71 being open. Cold air may be admitted into the flue 22 from the inlet 50 if the dampers 71, 53 and 19 are closed, the dampers 52, 21 and 20 being open. The air inlet 47 may be used for admitting air into the flue 22 provided the dampers 49, 54, 71, 52 and 19 are closed, the dampers 48, 55, 53, 21 and 20 being open.

In order to admit air to the flue 22 through the inlet 42, the dampers 43, 48, 54, 71, 52 and 19 are closed, the dampers 44, 49, 55, 53, 21 and 20 being open. Cold air may be admitted through the inlet 29 by opening the damper 30, and cold air may be admitted through the inlet 26 by opening the damper 27. By closing the dampers 54, 27, 30 and 36 and by opening the dampers 34, 68 and 24, heated air drawn in through the pipe 23 may be made to traverse the pipe 25, the part 32 and the outlet 33, and be delivered into the combustion space 3. If, however, the damper 33 be closed, the damper 36 be open, and the damper 43 be open, the air will traverse the pipes 25, 35 and 37, the damper 40 being opened, under which circumstances the heated air may be delivered into the chamber 8 below the grate 4 through the perforated head 38. By closing the dampers 36, 68, 30, 27, 53, 48 and 44, and by opening the dampers 40, 43, 49, 55, 54 and 24, heated air drawn downwardly through the flue 22 may be delivered by means of the pipes 45, 41, 35 and 37 to the space 8 below the grate 4 and through the perforated head 38. If, however, under the circumstances last above described, the damper 40 is closed, the damper 36 being opened, the damper 68 being closed and the damper 34 being open, the heated air will pass along the back of the oven, beneath the oven, upwardly in front of the oven and out of the discharge element 33 into the combustion space 3.

The dampers 39 constitute a second grate located below the grate 4. The dampers 39 may be closed for two purposes. First, to prevent the ashes in the ash pit from backing up around the perforated discharge head 38, and second to define a compartment 8, closed at its bottom and adapted to receive the air from the perforated head 38. When it is desired to drop the ashes from the grate 4 into the pit 6, the grate forming dampers 7 move to open positions, thereby permitting the ashes to pass down between the parts 7 into the ash pit 6.

In Figs. 3 and 4 of the drawings, many parts of the invention remain unchanged, the structure being merely adapted for use upon a boiler. Parts previously described in detail are represented by reference characters previously used, with the suffix "a" the upper portion of Fig. 1 of the drawings being referred to. The air pipe 17ª is connected by a branch 72 with the jacket 12ª and a damper 73 is placed in the pipe 17ª between the air inlet 18ª and the branch 72. A damper 74 is placed in the pipe 17ª above the air inlet 50ª. The end 23ª of the flue within the drum 9 is formed into a branch 75 provided with a damper 76, the branch 75 being fashioned into a coil 77 surrounding a boiler 78 located within a casing 79. The forward convolution 80 of the coil 77 terminates in an upstanding air inlet 81 controlled by a damper 82. The part 23ª is formed into lateral extensions 83, communicating with forwardly and rearwardly extended upper loops 84 provided with dampers 111, the upper loops 84 communicating with lower loops 85, the loops 84 and 85 being located on opposite sides of the boiler 78 as clearly shown in Fig. 4. As shown at 86, the forward convolution 80 of the coil 79 is connected with the bend of one upper loop 84 and in the connection 86 is disposed a damper 87. The bend 84 communicates with an air inlet 88 controlled by a damper 89 and connected to a downwardly extended air inlet pipe 90 having a damper 91. Each lower loop 85 merges into a rear loop 92 connected as shown at 93 with the coil 77. The lower portions of the rear loops 92 communicate at their forward ends with a discharge member 96 corresponding to the part 33 of Fig. 1 and provided with a damper 97 corresponding to the damper 34. Communicating with the discharge member 96 and with the lower portions of the loops 92 is an upright pipe 98 corresponding to the pipe 35 of Fig. 1 and equipped with a damper 99 represented in Fig. 1 by the damper 36. The pipe 98 has an outlet 100 corresponding to the part 37 and provided with a damper 101. The upper grate appears at 102 and the lower, or damper formed grate 103 corresponds to the grate 39, the compartment 104 being represented in Fig. 1 by the compartment 8. The forward convolution 80 of the coil 77 may be provided with a depending air inlet 94 extended downwardly beyond the grates and provided with a damper 95. The lower end of the pipe 45ª is given a sinuous form as shown at 105, the part 105 communicating with a pipe 107 passing through a wall 108, the pipe 107 communicating with a coil 109 connected as shown at 110 with the pipe 98.

From what has been stated hereinbefore in connection with that form of the invention shown in Fig. 1 it will be obvious that the air is adequately heated by the products of combustion and may be selectively delivered either below the grate 102 or above the grate.

In Fig. 5 of the drawings, the invention is shown as applied to a steam boiler. Many parts of the structure employed in Fig. 1 remain unchanged and are designated by reference characters previously used, with the suffix "b." A boiler 112 is mounted within a casing 114 and is surrounded by a jacket 115 having an air outlet 106 discharging above a main grate 117, the lower grate 118 being of the movable type hereinbefore described and coöperating with the grate 117 to form a compartment 119. The part 23ᵇ corresponding to the element 23 of Fig. 1 communicates with the interior of the jacket 115. Mounted in the casing 114 is an upright pipe 120 communicating as shown at 124 with the interior of the jacket 115. The pipe 120 is provided at its lower end with a damper 121 and communicates with a flue 122 having an inlet 123, the flue 122 having an extension 125 discharging beneath the grate 117. A similar flue 126 and extension 127 may be employed upon the opposite side of the boiler if desired. Disposed parallel to the boiler 112 and communicating with the interior of the jacket 115 is a flue 128 communicating with a lateral pipe 129 and having a damper 130, the pipe 129 communicating with an air pipe 131 having a damper 132. Communicating with the pipe 129 and upstanding therefrom is a pipe 133 controlled by a damper 134. The construction obviously is such that the heated products of combustion may pass above and below the grate 117.

In Fig. 6 of the drawings, many parts used in Fig. 1 are employed, such parts being designated by former reference characters with the suffix "c." The drum 9ᶜ is provided with a pipe 171 entering a fire pot 135 inclosed within a casing 136. The numeral 137 indicates the main grate, the numeral 138 indicating the lower grate of the type hereinbefore described. The ash pit is shown at 139, and the compartment between the grates appears at 140. In the pipe 171 is located a damper 141. One arm 142 of the flue 22ᶜ passes outside of the drum 9ᶜ and enters the fire pot 135 through the casing 136 although the part 142 may be located otherwise if desired. In the member 142 is a damper 143. The portion 142 of the flue 22<sup>c</sup> is provided with a branch 144 opening into the compartment 140 as shown at 172. The pipe 142 is further formed into two branches 145 and at the point where these branches diverge from the parts 142 and 144 is located a damper 173. One of the branches 145 is provided with a nipple 159 which enters the fire pot 135. The branches 145 which extend around the fire pot in opposite directions intersect as shown at 146 and at their lower ends enter into the compartment 140 as shown at 147. A branch 148 leads from the pipe 142 and communicates with a pipe 149 located above the fire pot and terminating in an air inlet 150 having a damper 151. The pipes 148 and 149 communicate with a pipe 174 extended downwardly in front of the fire pot 135 and entering the compartment 140 as shown at 152. The upright portion of the pipe 174 is provided with an air inlet 153 having a damper 154, dampers 155 and 156 being located, respectively, above and below the inlet 153 in the pipe 174. A nipple 157 projects from the pipe 174 and enters the fire pot 135, the nipple having a damper 158. Branched off from the pipe 174 is a coil 160 surrounding the fire pot 135 and opening as shown at 161 into the compartment 140. A connection 162 unites one of the branches 145 with the branch 144 and in the element 162 is disposed a damper 163. A connection 164 connects the branch 144 with the lower part of the pipe 17<sup>c</sup> and in the connection 164 is placed a damper 165. Dampers 166 and 167 lie respectively above and below the connections 164 and 162, and are placed in the branch 144. Dampers 168 and 169 operate in the branch 144 above and below the nipple 170 which enters the fire pot 135.

From what has been stated hereinbefore relative to the form of the invention referred to in Fig. 1, it will be obvious that in the form of invention shown in Fig. 6, the air is adequately heated by the products of combustion and is delivered into the fire pot and into the compartment 140 lying below the grate 137.

In that form of the invention which is shown in Fig. 7, parts previously alluded to in Fig. 6 are designated by numerals previously used, with the suffix "d." A pipe 177 forms a communication between the pipes 144<sup>d</sup> and 145<sup>d</sup> upon the one hand and the pipes 149<sup>d</sup> and 174<sup>d</sup> upon the other hand. In the pipe 177 is disposed a damper 178. Mounted on top of the stove body is a casing 179 in which is placed a flue 180 of any desired sort, the same having an upright air inlet 181 controlled by a damper 182 and being provided with a horizontal air inlet 183 controlled by a damper 184. The flue 180 is connected as shown at 185 with the pipe 149<sup>d</sup> and carries a damper 186. A pipe 187 communicates with the flue 180 and this pipe is adapted to communicate with the lower portion of such a structure and the jacket 12<sup>c</sup> of Fig. 6. A pipe 188 is adapted to communicate with one end 189 of such a structure as the flue 22<sup>c</sup> of Fig. 6. The other end of the flue 22<sup>c</sup> is connected with the pipe 142<sup>d</sup>. Branched from the flue end 189 is a pipe 190 communicating with the flue 180 and having a damper 191. A pipe 192 establishes communication between the flue 180 and the pipe 188. The modification shown in Fig. 7 comprises mainly as its distinguishing features, the casing 179 and the flue 180 therein.

In the modification disclosed in Fig. 8, many of the parts of Fig. 1 are employed, duplicated parts being represented by reference characters previously used with the suffix "e". Practically the only modification in the upper portion of the structure resides in the fact that the jacket 12<sup>e</sup> and parts within the same are offset slightly as indicated at 193. The lower end 194 of the flue inside of the drum 9<sup>e</sup> and corresponding to the flue 22 is bifurcated to form a branch 195 and a branch 196, the latter being in the form of a coil. The branch 195 extends along the top of a boiler inclosed with a casing 197. The branch 195 is connected at 198 with a tube 199 extended around the boiler in spiral form, the tube 199 being provided with an air inlet 200 controlled by a damper 201, the tube 199 communicating with the branch 196. In the tube 199 is disposed a damper 201, one end 202 of the tube 199 opening into a compartment 203 formed between the grate 204 and the grate 205. Branched off from the spiral tube 199 is an extension 206 having a damper 207, the extension 206 entering the combustion space 208 above the grate 204. By means of a lateral pipe 209 the extension 206 communicates with the space between the shell of the boiler 196 and the casing 197. The coiled branch 196 of the flue end 194 is provided with a side air inlet 211 controlled by a damper 212. The branch 195 is provided with a top air inlet 213 controlled by a damper 214. The branch 195 of the flue end 194 communicates with a downwardly extended air pipe 214 having a damper 215, the end of the branch 195 terminating in an air inlet 216 controlled by a damper 217. The construction of the modification shown in Fig. 8 is such that after air has been heated in the drum and attendant parts, by the products of combustion, the heated air may be directed either above or below the grate 204.

Having thus described the invention, what is claimed is:—

1. In a device of the class described, a heater; a grate in the heater; an outlet for the products of combustion; a flue in the outlet and having an air inlet, the flue comprising branches, one of which discharges above the grate, the other of which discharges below the grate; and a movable closure extended transversely of the heater below the grate and defining a compartment into which said other branch discharges.

2. In a device of the class described, a heater; a drum communicating with the heater; a flue in the drum and communicating with the heater, the flue having an air inlet; a stack communicating with the drum; a jacket surrounding the stack and defining a compartment; means for establishing communication between the compartment and the flue; an air pipe; means for establishing communication between the air pipe and the compartment; and means for establishing communication between the air pipe and the flue within the contour of the heater.

3. In a device of the class described, a heater; a drum communicating with the heater; a flue in the drum and communicating with the heater; a stack communicating with the drum; a jacket surrounding the stack and defining a compartment; means for establishing communication between the compartment and the flue; an air pipe; means for establishing communication between the air pipe and the compartment; and means for establishing communication between the air pipe and the flue.

4. In a device of the class described, a heater; an outlet for the products of combustion; a drum communicating with the outlet; a flue in the drum, the flue discharging into the heater and having an air inlet; a main stack communicating with the drum; an auxiliary stack in the main stack; a jacket surrounding the main stack and defining a compartment; means for establishing communication between the compartment and the flue; a damper controlling each stack; a coil surrounding the auxiliary stack; means for establishing communication between the coil and the flue; an inlet for the coil; and an inlet for the compartment.

5. In a device of the class described, a heater; an outlet for the products of combustion; a drum communicating with the outlet; a flue in the drum, the flue discharging into the heater; a main stack communicating with the drum; an auxiliary stack in the main stack; a jacket surrounding the main stack and defining a compartment; means for establishing communication between the compartment and the flue; means for establishing communication between the coil and the flue; an air pipe; means for establishing communication between the air pipe and the flue; and means for establishing communication between the air pipe and the compartment.

6. In a device of the class described, a heater; a grate in the heater; a drum communicating with the heater; a flue in the drum and having branches discharging respectively above and below the grate, each of said branches having air inlets; means for controlling the said inlets; an air pipe; means for establishing communication between the air pipe and the flue; a stack communicating with the drum; a jacket surrounding the stack and defining a compartment; means for establishing communication between the compartment and the flue; and means for establishing communication between the air pipe and the compartment.

7. In a device of the class described, a heater; a grate therein; a drum communicating with the heater; a flue in the drum comprising branches discharging respectively above and below the grate; air inlets in said branches; means for controlling the air inlets; an air pipe; means for establishing communication between the air pipe and the flue; a main stack communicating with the drum; an auxiliary stack located within the main stack; a jacket surrounding the main stack and defining a compartment; means for establishing communication between the compartment and the flue; means for establishing communication between the compartment and the air pipe; a coil surrounding the auxiliary stack; means for establishing communication between the coil and the flue; an air inlet for the flue; and an air inlet for the compartment.

In testimony that I claim the foregoing as my own, I have hereto affixed my signature.

JACOB BREWER.

Copies of this patent may be obtained for five cents each, by addressing the "Commissioner of Patents, Washington, D. C."